United States Patent [19]

Malashenko

[11] Patent Number: 4,690,049

[45] Date of Patent: Sep. 1, 1987

[54] HYDRAULIC PRESS WITH SIDE SLAB GUIDED UPPER PLATEN

[75] Inventor: Leon Malashenko, Toronto, Canada

[73] Assignee: John T. Hepburn, Limited, Mississauga, Canada

[21] Appl. No.: 922,542

[22] Filed: Oct. 24, 1986

[30] Foreign Application Priority Data

Nov. 12, 1985 [CA] Canada .................................. 495086

[51] Int. Cl.$^4$ .............................................. B30B 7/02
[52] U.S. Cl. .................................. 100/214; 100/257; 100/219; 100/269 R; 100/258 A
[58] Field of Search ...................... 100/214, 269 R, 46, 100/258 R, 219, 224, 258 A, 257; 264/40.5, 325

[56] References Cited

U.S. PATENT DOCUMENTS

| | | | |
|---|---|---|---|
| 3,938,362 | 2/1976 | Falk et al. | 100/214 |
| 4,157,066 | 6/1979 | Pretty | 100/258 A X |
| 4,283,825 | 8/1981 | McKay et al. | 100/257 X |
| 4,295,358 | 10/1981 | Bulmer | 100/214 |
| 4,470,346 | 9/1984 | Nelson | 100/214 |
| 4,604,930 | 8/1986 | Avila et al. | 100/257 X |

Primary Examiner—Werner H. Schroeder
Assistant Examiner—Andrew M. Falik

[57] ABSTRACT

A 2000 ton hydraulic press which can be conveniently retrofitted for platen parallelism control has a conventional support structure which includes a base, a pair of side slabs and a cross-head. A lower platen is fixed to the base structure, and an upper platen is guided on the side slabs for vertical movement towards and away from the lower platen. Short-stroke, large bore compression-phase hydraulic cylinders are mounted within the lower platen, and have piston rods extending vertically through an upper surface of the lower platen. A vertical post is supported from each piston rod, and travels through an aligned vertical passage provided in the upper platen. A pair of long-stroke, narrow bore hydraulic cylinders permit the upper platen to be advanced quickly towards the lower platen to close the gap between the platens. Shoulders formed on the posts (all horizontally aligned when the compression-phase cylinders are fully extended) define a stop locating the upper platen a predetermined distance above the lower platen. Locking mechanisms mounted on the top of the upper platen can then be engaged with recesses formed in the posts to lock the upper platen to the posts. The compression-phase cylinders then draw the posts downwardly, moving the upper platen towards the lower platen and permitting a work-piece to be compressed between the platens.

7 Claims, 4 Drawing Figures

HYDRAULIC PRESS WITH SIDE SLAB GUIDED UPPER PLATEN

FIELD OF THE INVENTION

The invention relates generally to hydraulic presses, and more specifically, though not exclusively, to presses intended to apply high compressive forces.

BACKGROUND OF THE INVENTION

Presses used in compression molding have generally comprised a rigid steel frame with a base, a pair of opposing side slabs and an upper cross-head. An upper platen is fitted between the side slabs and guided on appropriate guide surfaces machined or otherwise provided on the side slabs. A lower platen, positioned to confront the upper platen, is supported from the base by a multiplicity of short-stroke hydraulic cylinders. A large bore, long-stroke, central ram, suspended from the cross-head, has generally served as means for advancing the upper platen towards the lower platen, to reduce the substantial separation existing between an upper mold member and a lower mold member, commonly fixed to the platens at the start of the molding cycle. The upper platen is commonly advanced until it engages mechanical stops attached to the side slabs, with a comparatively small separation between the mold members. The ram is then allowed to continue operating under full working-pressure against the mechanical stops during the subsequent compression stage of operation. The lower platen is then be advanced by means of the four short-stroke hydraulic cylinders to compress the upper and lower mold members, and more specifically, to compress a charge of molding compound placed between the mold members. The upward force of the short-stroke cylinders is of course resisted by the central cylinder suspended from the cross-head.

Sensors are positioned at a number of locations between the upper and lower platens to provide information regarding relative tilting of the platens. Appropriate controls responsive to the sensors regulate operation of the four short-stroke cylinders, individually, to ensure parallel pressing. Compression molding processes operating in this manner are well known, and a typical parallelism control is described, for example, in U.S. Pat. No. 4,076,780 which issued on Feb. 28, 1978 to Edwin D. Ditto.

Such presses have a number of disadvantages. The central ram, which must have both a long-stroke and a capacity to accomodate the full compressing force generated by the press, is large and expensive. Cycle time tends to be very slow, because of the time delay inherent in advancing a large bore, large-stroke cylinder. A large reservoir of hydraulic fluid is required to accomodate the capacity of the central cylinder and the expansion required of the cylinder. The housing must be massive and very robust to withstand the forces generated during compression.

Presses which embody a high degree of parallelism control and which eliminate the need for a large central ram and robust support structure have recently become available. Such presses incorporate a moveable lower platen supported by a multiplicity of short-stroke, large bore hydraulic cylinders which are actuated only during the compression phase of operation. A moveable upper platen is interfitted with cylindrical guide posts, rigidly fixed to an associated support structure, that guide the upper platen towards and away from the lower platen. The separation between the platens can be quickly reduced by means of small bore, long-stroke cylinders which act between the frame and upper platen until the compression phase of operation can be commenced. What is believed to be a hydraulically-actuated, chuck-like clamping mechanism, carried in the interior of and fixed to the upper platen, is then actuated to friction grip the cylindrical guiding surfaces of the posts thereby fixing the upper platen to the guide posts. The lower platen is then advanced by means of the short-stroke cylinders, with sensors regulating operation of the cylinders to ensure parallelism, to compress a work-piece between the platens. Such presses are very expensive, and, because the lower platen must move, lack versatility, not readily permitting the implementation, for example, of certain high-pressure injection molding processes in which mold members are clamped between upper and lower press platens and a nozzle engaged with the mold.

A press design is disclosed which lends itself to parallelism control, which is comparatively inexpensive and which has a stationary lower platen.

BRIEF SUMMARY OF THE INVENTION

The invention provides a hydraulic press comprising a support structure including a base structure that defines a lower platen. Guide means mounted on the support structure serve to direct an upper movable platen vertically towards and away from the lower platen. A multiplicity of "compression-phase hydraulic cylinders" are provided, that is, cylinders intended to apply the compressive forces required during actual pressing, these most conveniently being short-stroke, short bore cylinders. Each compression-phase cylinder has a body member fixed to the base structure, and a piston rod oriented for vertical movement. A multiplicity of vertical posts are supported from the compression-phase hydraulic cylinders for vertical movement with the associated piston rods.

The upper platen has a multiplicity of vertical passages, each aligned with one of the multiplicity of posts so that the upper platen can be displaced vertically relative to the upstanding posts. Releasable locking means are provided to permit the upper platen to be locked to the vertical posts. Once the upper platen is locked to the posts, the compression-phase hydraulic cylinders can be actuated to draw the posts vertically towards the base structure. This in turn causes the upper platen to be drawn towards the lower platen, permitting a work-piece such as upper and lower mold halves containing a molding charge to be compressed between the platens. Upper platen displacement means permit the upper platen to be moved relative to the posts, when the locking means are released, and preferably take the form of "rapid advance hydraulic cylinders", namely, cylinders with a comparatively long-stroke and narrow bore that extend and contract more quickly in response to hydraulic pressure than the compression-phase cylinders.

Various inventive aspects and advantages associated with a preferred embodiment of the press will be described in greater detail below.

DESCRIPTION OF THE DRAWINGS

The invention will be better understood with reference to drawings illustrating a preferred embodiment in which.

DESCRIPTION OF PREFERRED EMBODIMENT

Figure 1:
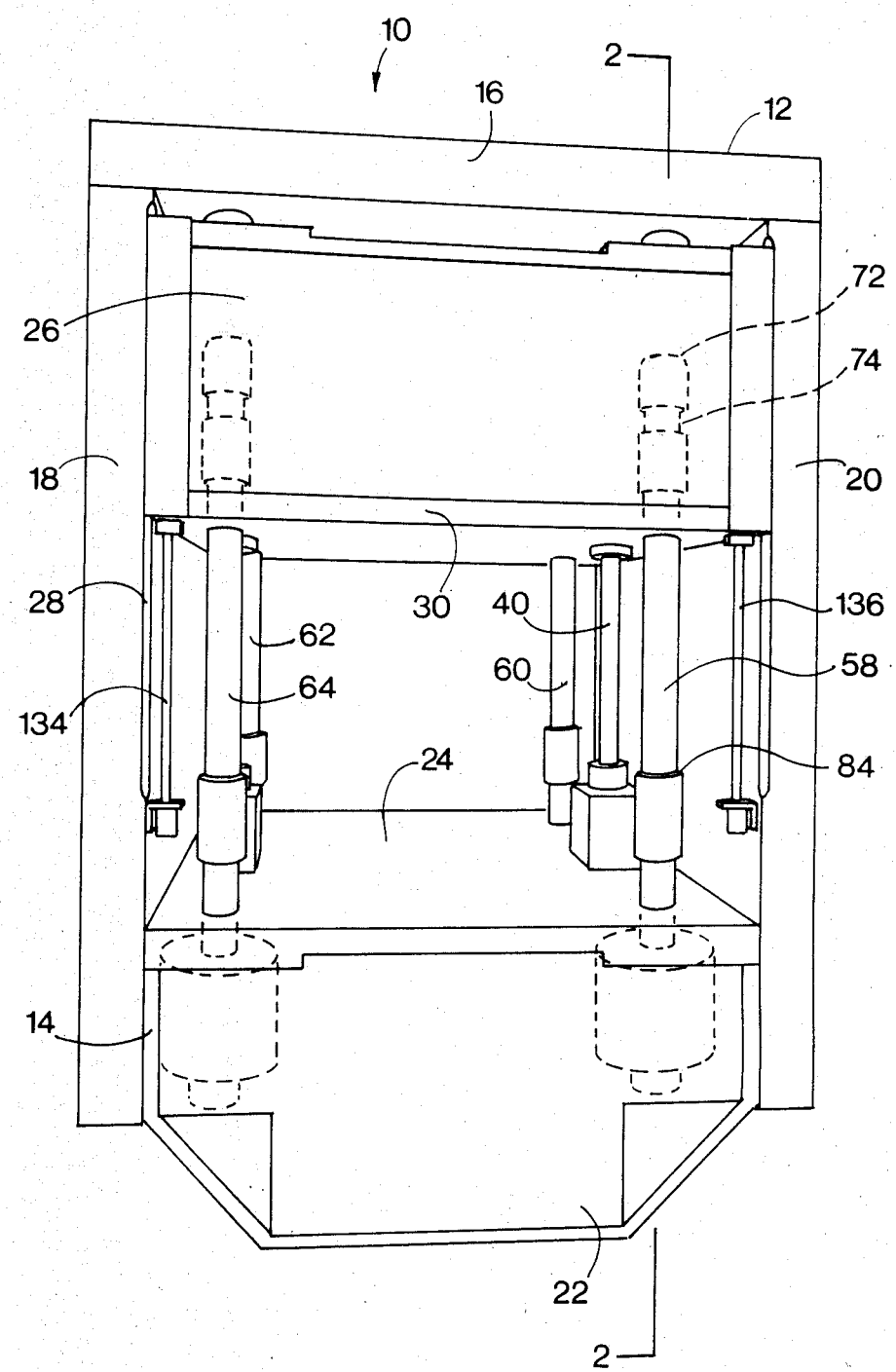
FIG. 1 is a perspective view of a press viewed from the front, and slightly from the left to provide a better understanding of the location of various hydraulic cylinders.

Reference is made to FIG. 1 which illustrates a preferred embodiment of the invention, a hydraulic press 10 having a 2,000 ton capacity. Throughout this disclosure the press 10 will be described with reference to a compression molding process; however, the invention should not be viewed as limited to such applications.

The design of the press 10 permits the hydraulic pumps and motors required for operation of the press 10 to be mounted entirely at ground level. This reduces the overall height of the press and significantly reduces the cost of installing the required hydraulic equipment and conduits. The hydraulic fluid lines associated with the press (which are numerous) have for the most part been omitted in the drawings, except to the extent necessary to highlight innovative features associated with operation of the press 10, as they would obscure the drawings. The appropriate installation of such lines will be readily apparent to those familiar with press design and the operation of hydraulic cylinders.

The press 10 has a support structure 12 of a basically conventional steel plate construction. The support structure 12 includes a base structure 14, a cross-head 16, and a pair of opposing side slabs 18, 20. The base structure 14 defines a fixed lower platen 22, the upper surface of which is defined by a conventional T-slotted steel bolster plate 24 (slots not illustrated) that permits a mold member to be attached with bolts. The lower platen 22 is reinforced in a customary manner to withstand the loads expected during the press's compression phase of operation.

An upper platen 26 is guided towards and away from the lower platen 22 by the opposing side slabs 18, 20. Interior corner edges of the side slabs 18, 20 carry polished guide plates, vertically oriented and fastened to the side slabs by means of countersunk bolts. A guiding surface defined by one such plate is indicated with a reference numeral 28 in FIG. 1. The upper platen 26 has conforming surfaces which engage the various guiding surface. Such platen guiding techniques are well understood in the press industry, but in this application the guide plates are extended beyond customary lengths to mechanically maintain parallelism between the upper and lower platens through rapid approach and return phases of press operation.

The upper platen 26 includes a conventional T-slotted bolster plate 30 (slots not indicated) which defines the lowermost surface of the platen 26 and to which an upper mold member can be bolted. The plate 30 is reinforced by a network 32 of steel plates welded at right angles to provide the rigidity required to withstand any significant deflection during the press's compression phase of operation.

Four compression-phase hydraulic cylinders and two rapid advance cylinders are provided. All these cylinders are of the double-acting type. The former are used primarily during the compression phase of operation to compress a molding charge between upper and lower mold members, and for initial separation of the mold members following processing of the charge. The rapid advance cylinders are used for gross positioning of the upper platen 26 relative to the lower platen 22 either prior to compression or subsequent to mold separation. Their function is primarily to permit quick separation of the platens for interchangement of mold parts of introduction of a molding charge. The six cylinders are arranged in two identical sets of three each; one set consisting of two compression-phase cylinders and one rapid advance cylinder being located adjacent and inset from each of the opposing side slabs 18, 20. Only one such set will be described in detail, the corresponding cylinders of the other set being substantially identical and similarly mounted.

Figure 2:
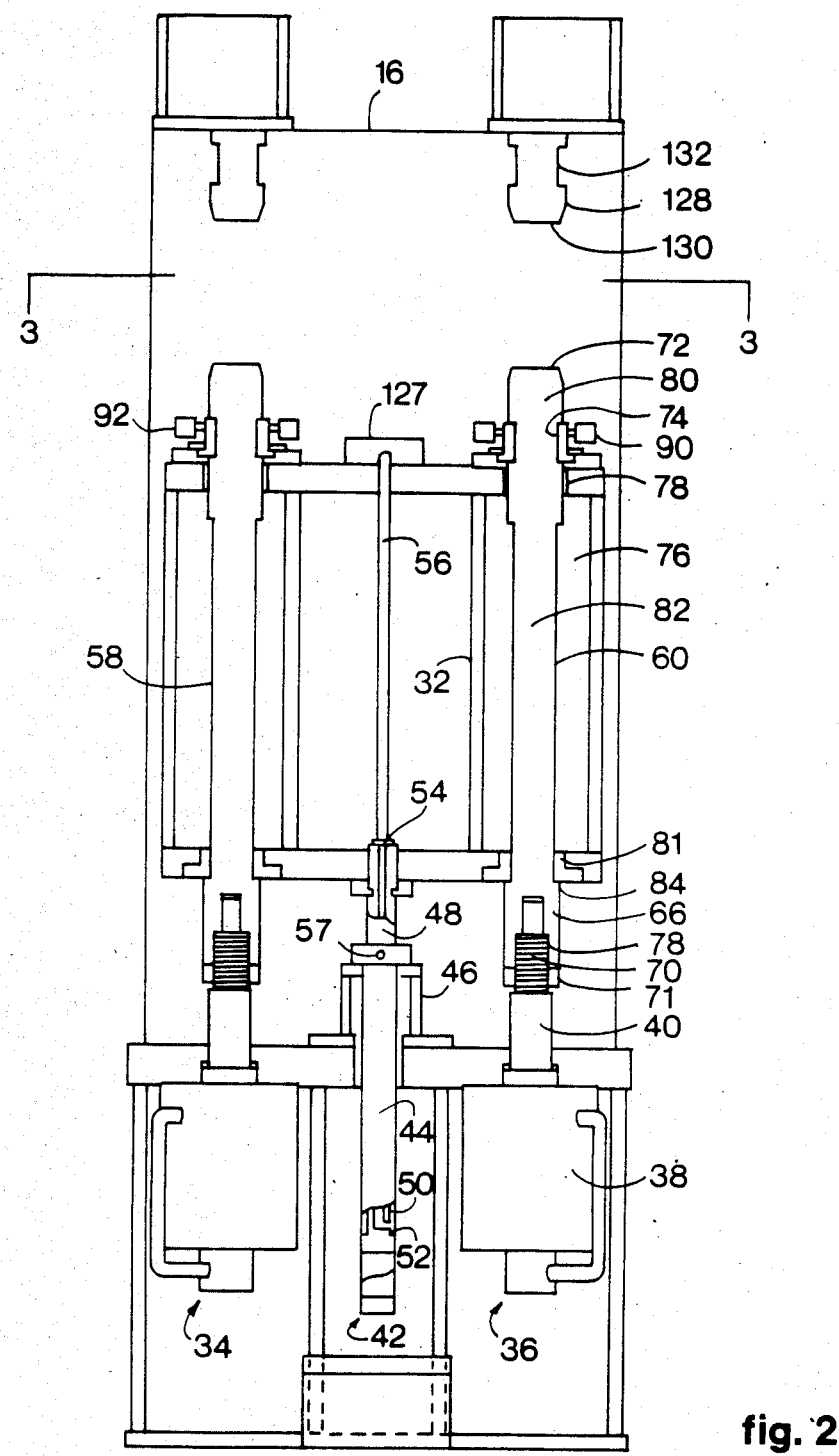
FIG. 2 is a view along the lines 2—2 of FIG. 1 (with a number of press components not in section and other fragmented for clarity)
Figure 3:
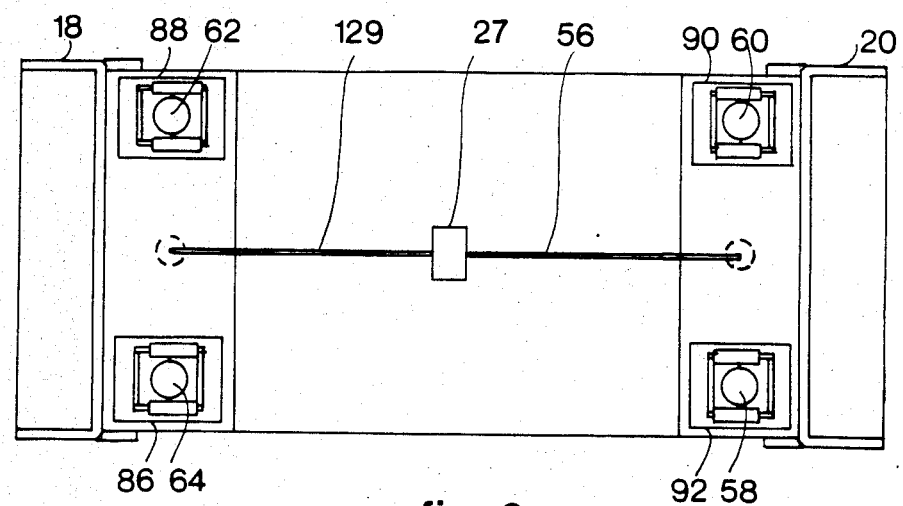
FIG. 3 is a view along the lines 3—3 of FIG. 2 indicating the location of various locking mechanism which serve to fasten an upper platen associated with the press to certain posts; and, FIG. 4 is an isometric view of one of the locking mechanisms.

The cylinder sets positioned proximate to the side slab 20 will be discussed with reference to FIG. 2, where the various cylinders are illustrated in greater detail. The set includes two compression-phase cylinders 34, 36 which are short-stroke, large bore cylinders sized to apply substantial compressive forces. The cylinders 34, 36 are bolted to the lower platen 22 whose thickness in the vicinity of the cylinders is about 8 inches. The cylinder 36 which is typical of all four compression-phase cylinders has a body member 38 and a piston rod 40 which moves vertically relative to the body member 38 under the influence of hydraulic oil under pressure.

The manner of attachment of the cylinder 36 (and other compression-phase cylinders) to the lower platen 22 should be noted. The body member 38 is abutted against the bottom of the bolster plate 24 associated with the lower platen 22 and secured thereto with bolts. Consequently during the compression phase of operation, the large compressive forces generated by the compression-phase cylinders which might otherwise be borne by the base structure underlieing the bolster plate 24 and alternative cylinder attachment structure are reacted into the work-piece being compressed. This reduces the loading requirements placed on the base structure 14, and significantly reduces the cost of securing the compression-phase cylinders to the base structure.

The set of cylinders also includes a rapid advance cylinder 42 which is a long-stroke, narrow bore cylinder sized primarily to bear the weight of the upper platen 26. The cylinder 42 has a body member 44 which is bolted to the lower platen 22 by means of an intermediate steel support structure 46. The associated piston rod 48 is attached to the upper platen 26 at its T-slotted plate 30. The piston rod 48 which moves with the upper platen has a hollow bore 50 accessible at opposing rod ends 52, 54 for receipt and transfer of hydraulic oil. A conduit 56, in communication with the open rod end 54, extends through the interior of the upper platen 26 to uppermost platen surfaces. The conduit 56 serves to communicate hydraulic oil to hydraulically-actuated locking mechanisms (discussed below) which are mounted on the top of the upper platen 26. The hydraulic cylinder 42 is adapted in the standard manner to receive and exhaust hydraulic fluid at its upper and lower ends, and has a fluid port 57 at its upper end which communicates with the interior cylinder region surrounding the piston rod 48. When the piston rod 48 is fixed against movement (by closing the appropriate valve to prevent fluid movement into and out of the lower end of the hydraulic cylinder 42), as when movement of the upper platen 26 is discontinued, hydraulic fluid can be pumped into the fluid port 57 and through the conduit 56 to the locking mechanisms on the platen. The corresponding rapid advance cylinder proximate to the side slab 18 is similarly adapted for passage of hydraulic fluids, but functions as a return line for hydraulic fluid flows. this is a singularly advantageous arrangement which facilitates the running of hydraulic fluid lines to the locking mechanisms, and will be discussed further below.

Four vertical posts 58, 60, 62, 64 (best indicated in FIG. 1) are supported each from a different one of the four compression-phase cylinders. The mounting of the post 60 which is typical will be discussed with reference to the end view of FIG. 2. The post 60 has a lower end portion 66 formed with a threaded opening 68. The opening 68 receives a threaded end portion 70 of the piston rod 40 associated with the compression-phase cylinder 38, and a lock nut 71 secures the threaded connection. The post 60 has an uppermost free end 72, and has an annular recess 74 proximate to the free end 72 (which recess is used in connection with an upper platen locking function described more fully below).

The upper platen 26 has four vertical passages, each aligned with a different one of the four posts 58-64 and each dimensioned for guided passage of the associated post. The passage 76 associated with the post 60 is typical. The passage 76 has an opening at the top of the upper platen defined by a bushing 78. The bushing 78 conforms in dimension to the outer surfaces of the upper portion 80 of the post 60 (which upper post portion is comparatively large relative to a central, elongate post portion 80). The passage 76 has another opening at the bottom of the upper platen 26, defined by a split insert collar 81. The collar 81 serves very significant functions: it permits the cross-section of the post 60 at the recess 74 to be maintained comparatively large to withstand tensile stresses during the compression phase of operation (that is, simultaneously permitting variations in posts diameter and assembly of the upper platen and the post in interfitted relationship); provides a hardened surface to withstand high stresses during stripping of an upper mold member from a lower mold member; and ensures proper guiding of the post 60 to prevent radial loads on the hydraulic cylinder 36. The collar 81 conforms in dimension to the outer surface of the central post portion 82, and the upper platen 26 can accordingly move vertically relative to the four posts. The lower end portion 66 of the post 60 is enlarged relative to the post portion 82 to define an annular shoulder 84.

The shoulder 84 together with similar shoulders on the other posts, define a stop limiting lowering of the upper platen 26 relative to the posts. The shoulders are placed at a predetermined position along the length of each post, the position having been so selected that when all compression-phase cylinders are fully extended, the shoulders align horizontally, spacing the upper platen 26 a predetermined distance from the lower platen 22 in substantially parallel relationship. It should be noted that the threaded mounting of the posts on the piston rods associated with the compression-phase cylinders permits mechanical of the parallel relationship of the upper and lower platens, if stricter electronic parallelism control is not provided, and also mechanical adjustment of the height of the shoulders to accomodate different mold heights. In the latter respect, it should be noted that electronic sensing and hydraulic adjustment of the shoulder height is preferred. This can be accomplished by employing compression-phase cylinders of the type having built-in extension sensing and associated electronic and hydraulic controls, appropriately calibrated to regulate shoulder height rather than overall piston rod extension.

Figure 4:
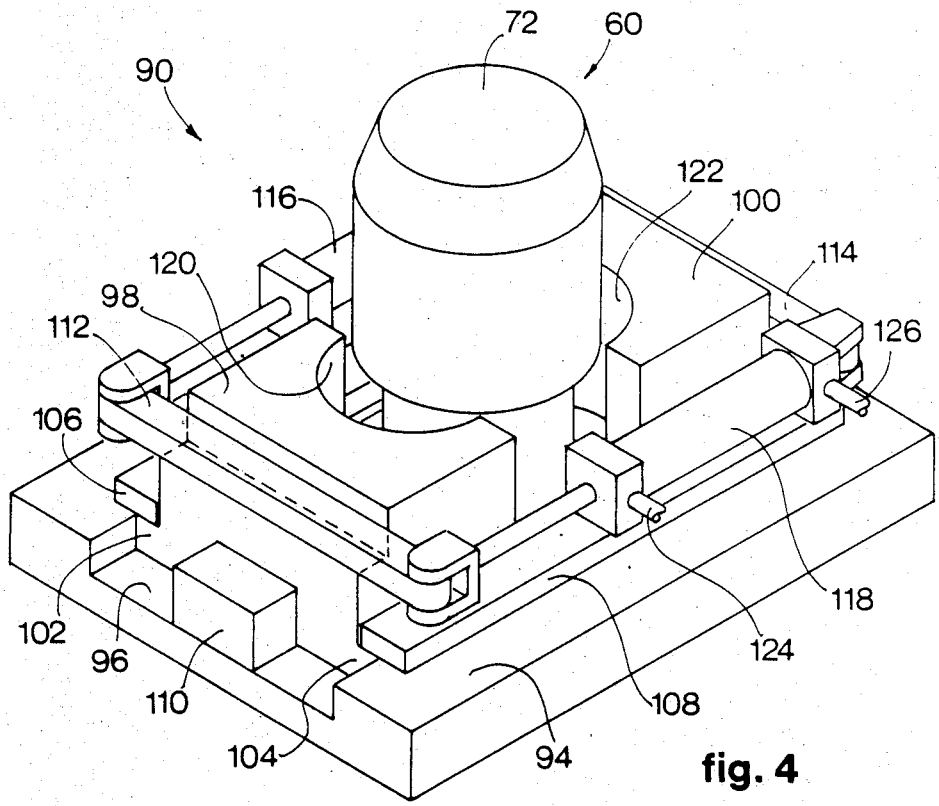

Four hydraulically-actuated lock mechanisms 86, 88, 90, 92 are fixed to the top of the upper platen 26, and act between the upper platen 26 and the posts to lock the upper platen to the posts. One lock mechanism is associated with each of the vertical posts. The lock mechanism 90 associated with the post 60 is typical, and its construction is detailed in the isometric view of FIG. 4. The lock mechanism 90 has a rectangular steel base plate 94 formed with an open-ended channel 96. The channel 96 crosses or intersects the passage 76 at the upper surface of the platen 26 (as apparent in FIG. 2) where the base plate 94 is apertured to permit vertical passage of the post 60. An identical pair of steel lock members 98, 100 are mounted for horizontal sliding movement in the channel 96, one horzontally to either side of the vertical passage 60. The lock member 98 has a pair of opposing longitudinal flanges 102, 104. These flanges are overlaid by a pair of steel plates 106, 108, bolted to the base member 94, flush with an upper surface thereof. A steel stop 110 is bolted to the base plate 94 after mounting of the lock members 98, 100 in the channel 96. A corresponding stop (not illustrated) is mounted outwardly of the locking member 100. A bar 112 is bolted to the lock member 98 transverse to the direction of sliding movement, and a corresponding bar 114 is similarly mounted on the other lock member 100. The bars 112, 114 are joined by a pair of hydraulic cylinders 116, 118 using standard clevis connections. The cylinders 110, 112 can accordingly be selectively actuated to draw the lock members together or to separate them. The locking members 98, 100 are formed with semi-circular recesses 120, 122, respectively, conforming to post surfaces in the interior of the post recess 74. In an unlocked position (FIG. 4) the lock members 98, 100 are disengaged from the post recess 74, permitting movement of the upper platen 26 relative to the post 60. In a locked position (FIG. 2), the locking members 98, 100 are engaged in the post recess 74, effectively locking the upper platen 26 to the post 60. The stops associated with the locking members 98, 100 ensure proper disengagement of the locking members from the recess 74, providing for the possibility that one locking member will move in preference to the other.

The manner in which hydraulic fluid is supplied and returned from the lock mechanism 90 for actuation of the hydraulic cylinders 116, 118 overcomes problems potentially created by movement of the upper platen 26. The hydraulic cylinder 118 receives hydraulic oil via two conduits 124, 126 (extensively fragmented) which permit application of pressure to the appropriate end of the cylinder 118 for either extension or contraction. The two conduits 124, 126 are coupled through a conventional flow switching valve 127 to the open rod end 54 of the rapid advance cylinder 42 for receipt of the required hydraulic oil under pressure. The flow switching valve 127 permits hydraulic oil under pressure to be applied selectively to the two conduits 124, 126 (and corresponding conduits on the cylinder 116) so that the lock members 98, 100 can be moved selectively between their locked and unlocked positions. Hydraulic fluid displaced from the cylinder 118 through the unpressurized one of the conduits 124, 126 is directed by the flow switching valve 127 via a conduit 129 to the bore formed in the other rapid advance cylinder. The two rapid advance cylinders and intervening conduits and switching valve effectively provide a hydraulic fluid circuit which eliminates the need for attachment of flexible conduits to the upper platen 26, an alternative which is complicated by the extent of travel of the upper platen 26, or the need for mounting of hydraulic pumping equipment and fluid reservoirs on or above the upper platen, an alternative which increases the cost and overall height of the press. The rapid advance cylinder 48 effectively serves as a supply line of hydraulic oil under press; the other rapid advance cylinder effectively serves as a return line. It will be understood that the other cylinder 116 associated with the locking mechanism 90 is similarly operated. All hydraulic pumps required by the press 10 are accordingly mounted at ground level which is singularly advantageous.

It should be noted that all four locking mechanisms 86–92 are simultaneously operated with hydraulic fluid received from the rapid advance cylinder 42. The expansion and contraction of the cylinders associated with all locking mechanisms is simultaneously regulated by the switching valve 127 (which directs the flow of the hydraulic fluid from the rapid advance cylinder 42). Return fluid flows from all locking mechanism 86–92 are all directed by the switching valve 127 to the other rapid advance cylinder. The various hydraulic fluid lines extending between the valve 27 and the eight hydraulic cylinders associated with the locking mechanisms have not been illustrated because of their number. The required installation of such The relationship between the shoulders and locking recesses formed on the posts 58–64 should be noted. In particular, the shoulder 84 of the post 60 is separated from the recess 74 by a predetermined distance. The separation is such that when the upper platen 26 stops against the shoulder 84 the recess 74 and locking mechanism 90 are precisely position for interlocking. The shoulders and recesses on the other posts are similarly spaced. This arrangement ensure consistent and positive locking of the upper platen 26 to the posts 58–64 the significance of which for practical-operation of the press 10 will be readily apparent.

The shoulders also provide a positive stop against lowering of the upper platen 26, and permit the platen 26 to be consistently positioned substantially parallel to the lower platen 24 upon commencement of the compression phase, whenever the compression-phase cylinders have previously been fully extended.

The press 10 has a convenient mechanism for locking the upper platen 26 to the support structure 12 in a raised position, as, for example, when the upper platen 26 is required to be stationary for an extended time after operation of the press 10 has been discontinued. This ensures that the rapid advance cylinders are not subject to loading while inoperative, and that the platen is secure when operator's are introducing molding charge, removing finished product, changing molds or performing maintenance functions beneath the upper platen. To that end, the cross-head 16 is provided with four downwardly depending posts, each axially aligned with, and spaced apart from, a different one of the vertical posts 58–64 associated with the compression-phase cylinders.

A post 128 is typical, and will be discussed with reference to FIG. 2. The post 128 is positioned immediately above the post 60 associated with the compression-phase cylinder 38. It has a free end 130 and an annular recess 132 proximate to the free end 130. When the upper platen 26 is raised to an uppermost position by the rapid advance cylinders, the post 128 is guided into the top of the vertical passage 76 formed in the upper platen 26. The post 128 is then so positioned that the locking mechanism 90 can engage the recess 132 formed in the post 128 to lock the upper platen 26 to the post. The upper platen can be simultaneously locked to the three other downwardly depending posts in a like manner.

The press 10 includes hydraulic control means for regulating parallelism between the upper and lower platens. Four sensors are provided for sensing the spacing between the upper and lower platens proximate to different ones of the four compression-phase cylinders and the associated posts. In FIG. 1, two such 131, 136 have been illustrated. These are standard linear transducers each having a stationary member fixed to one of the side slabs 18, 20 and a moving member fixed to the upper platen 26. The transducers have associated control circuitry which regulates supply of hydraulic oil to the compression-phase cylinders in such a manner as to maintain a substantially parallel relationship between the upper and lower platens, (more specifically, between their T-slotted plates) during compression of a work-piece. These sensing and hydraulic control arrangements are known in the art, and consequently will not be discussed in further detail.

The general operation of the press 10 will now be described in the context of a compression molding process. The upper platen 26 may initially be locked to the downwardly depending posts. Upper and lower mold halves are bolted to the upper and lower platens 22, 26, and a molding charge placed in the interior of the lower mold half. The compression-phase hydraulic cylinders may then be fully extended so that the shoulders associated with the vertical posts 58–62 are horizontally aligned to define a stop for the upper platen 26. The rapid advance cylinders can then be actuated to take up the load of the upper platen 26, and the locking mechanisms 86–92 associated with the upper platen 26, released from the downwardly depending posts. The rapid advance cylinders can then be used to lower the upper platen 26 onto the stop defined by the shoulders. With the upper platen 26 now positioned a predetermined distance above and substantially parallel to the lower platen 22, the four locking mechanisms 86–92 can be actuated to lock the upper platen 26 to the four posts 58–64. The compression-phase hydraulic cylinders can then be actuated to draw the four posts 58–64 downwardly towards the base structure 14, thereby advancing the upper platen 26 towards the lower platen 22 and eventually compressing the mold halves in charge. During this compression phase, the parallel relationship between the lower and upper platens 24, 26 is regulated by the various spacing sensors and associated controls. Following completion of the compression phase, the compression-phase cylinders are extended, thereby separating the mold halves, preferably until the cylinders are once again fully extended. The locking mechanisms 86–92 can then be released to disengage the upper platen 26 from the four posts 58–64, the load of the upper platen 26 being taken up by the rapid advance cylinders. The upper platen 26 can then be quickly raised by the rapid advance cylinders relative to the four posts to permit removal of the molded product and re-start of the molding cycle. Once operation is discontinued, the rapid advance cylinders can be used to raise the upper platen 26 to an uppermost position where the locking mechanisms 86–92 can latch the upper platen 26 to the four downwardly depending post.

It should also be noted that any appropriate mechanism can be substituted to perform the platen displacement function of the rapid advance cylinders. However, these cylinders are regarded as the most convenient mechanism for rapidly varying the separation between the lower and upper platens 22, 26. Also, other locking mechanisms may be substituted for those described to lock the upper platen 26 to the four posts 58–64 during the compression phase of operation. Use of shoulders in connection with such locking mechanisms is preferred for reasons stated above.

It should be noted that the press design described and illustrated lends itself to comparatively inexpensive manufacture of a press capable of providing the parallelism control required for in-mold coating processes and the like, or alternatively, capable of being retrofitted for such control without major mechanical adjustments, if not initially provided. Costs are reduced significantly because the overall design permits simple locking mechanisms to be used to fix the upper platen 26 to the associated posts. Use of a comparatively expensive, long-stroke, large-bore ram is avoided. Additionally, because forces involved in actual compression of a work-piece are borne largely by the vertical posts associated with the compresson-phase cylinders, the side slabs and cross-head need not be as robust as that of conventional presses having a large central ram suspended from the associated cross-head. Also, forces which would otherwise be borne by the base structure are reacted into the work-piece by virture of the abutting of the compression-phase cylinders against the bolster plate of the lower platen, reducing load constraints on components of the base structure and the cylinder attachment means. The rapid advance cylinders have been adapted to provide a singularly convenient means for supply or return of hydraulic fluid for operation of the locking mechanism attached to the upper platen. Their positioning for action between the base structure and the upper platen permits associated hydraulic equipment required to operate hydraulically-actuated devices on the upper platen to be located at base level, significantly reducing the cost and height of the design. It will be appreciated that the various advantages and cost savings associated with the press design make the press attractive even if not adapted for parallelism control.

The operation of the press 10 has been discussed in connection with a compression molding process. It should be noted, however, that the press 10 can also be advantageously used in connection with injection molding processes to conventiently hold mold members in a closed orientation against injection of thermoplastic materials under high pressure. In particular, the construction of the press 10 permits the lower platen 22 to remain stationary, and accordingly, the nozzle of an extruder used in connection with an injection molding process can be introduced between the upper and lower platens, most preferrably proximate to the stationary lower platen 22, without fear that the nozzle will be snapped by platen movement.

It will be appreciated that a particular embodiment of the invention has been described, and that modifications may be made therein without departing from the spirit of the invention or the scope of the appended claims.

I claim:

1. A hydraulic press, comprising:
   a support structure including a base structure which defines a lower platen;
   an upper moveable platen;
   guide means mounted on the support structure for guiding the upper platen vertically towards and away from the lower platen;
   a multiplicity of compression-phase hydraulic cylinders each having a body member fixed to the base structure and a piston rod oriented for vertical movement relative to the body member;
   a multiplicity of vertical posts, each of the posts being fixed to a different one of the compression-phase hydraulic cylinders for vertical movement with the piston rod associated with the compression-phase hydraulic cylinder, each post having an upper end portion formed with a recess;
   the upper platen having a multiplicity of internal vertical passages, each of the internal passages being aligned with, and dimensioned for guided passage of, one of the multiplicity of posts;
   releasable locking means attached to the upper platen for locking the upper platen to the vertical posts, the releasable locking means including a multiplicity of lock members and controllable lock member displacement means for displacing the lock members at least horizontally between locking positions in which the lock members engage the recesses in the posts and unlocking positions in which the lock members are disengaged from the posts; and,
   upper platen displacement means attached to the support structure for raising and lower the upper platen when the locking means are disengaged from the posts.

2. A hydraulic press as claimed in claim 1 in which each of the posts has a shoulder associated with the recess formed in the post;
   the spacing between each shoulder and associated recess is so selected that when the shoulders are horizontally aligned and the upper platen is seated against the shoulders, the lock members are positioned to engage the recesses when displaced to the locking positions.

3. A hydraulic press as claimed in claim 2 in which the locking means comprise:
   means defining a generally horizontal guide channel generally intersecting one of the vertical passages, a pair of the locking members being mounted for sliding movement within the guide channel one to either side of the vertical passage; and,
   a pair of hydraulic cylinders acting between the two locking members whereby the two locking members can be slid between the locking and unlocking positions.

4. A hydraulic press as claimed in claim 1 in which:
   the locking means comprise hydraulically-actuated means for moving the lock members selectively between the locking and unlocking positions.
   the upper platen displacement means include a plurality of rapid advance cylinders each having a body member attached to the base structure and a piston rod oriented for vertical movement and attached to the upper platen;
   one piston rod of the plurality of rapid advance hydraulic cylinders has an elongate hollow bore adapted for receipt and passage of hydraulic fluid; and, the locking means comprise flow directing means mounted on the upper platen and in fluid communication with the bore of the one piston rod at the upper platen for directing hydraulic fluid under pressure from the bore of the one piston rod to the hydraulically-actuated lock member moving means.

5. A hydraulic press as claimed in claim 4 in which:

another of the piston rods of the plurality of rapid advance hydraulic cylinders has an elongated hollow bore adapted for receipt and passage of hydraulic fluid;

the bore of the other piston rod is in communication with the hydraulically-actuated lock member moving means for receipt of return flows of hydraulic fluid.

6. A hydraulic press as claimed in claim 1 comprising sensing means for sensing the separation between the upper and lower platens at a multiplicity of horizontally space-apart positions each proximate to a different one of the compression-phase hydraulic cylinders, and control means responsive to the sensing means for so regulating application of hydraulic fluid to the compression-phase hydraulic cylinders that the upper and lower platens are maintained in a preselected relative orientation during compression of a work-piece.

7. A hydraulic press as claimed in claim 1 in which:
the lower platen has a bolster plate defining upper surfaces of the lower platen; and,
the body members of the compression phase cylinders are abutted against the bottom of the bolster plate with the associated piston rods extending upwardly though openings in the bolster plate.

* * * * *